United States Patent

[11] 3,564,247

| [72] | Inventor | Louis L. Packer<br>Hazardville, Conn. |
|---|---|---|
| [21] | Appl. No. | 558,065 |
| [22] | Filed | June 16, 1966 |
| [45] | Patented | Feb. 16, 1971 |
| [73] | Assignee | United Aircraft Corporation<br>East Hartford, Conn. |

[54] METHOD FOR MEASURING WALL THICKNESS OF ARTICLES USING GASEOUS RADIOACTIVE MATERIAL
6 Claims, 6 Drawing Figs.

[52] U.S. Cl. .................................................. 250/83.3,
250/43.5
[50] Field of Search........................................... 250/83.3
(D), 84, 43.5 (R), 43.5 (D), 83.3 (IR); 88/142;
250/106; 62/53

[56] References Cited
UNITED STATES PATENTS
2,884,538  4/1959  Swift, Jr. .................... 250/83.3X(D)
2,964,630  12/1960  Bosch ........................ 250/83.3D OTHER REFERENCES
Nucleonics, July 1960, Vol. 18, No. 7, pages 64—68

Primary Examiner—Ralph G. Nilson
Assistant Examiner—Davis L. Willis
Attorney—Finnegan, Henderson & Farabow ABSTRACT: A method is provided for measuring the wall thickness of hollow turbine blades and turbine vanes by transferring a radioactive gas into the hollow blades or vanes to fill the interior cavity of these articles with the radioactive gas, and then measuring the intensity of the radiation transmitted through the wall of the hollow blade or vane, the intensity of this radiation providing an indication of the thickness of the wall.

INVENTOR
LOUIS L. PACKER

BY Finnegan & Henderson

ATTORNEYS

INVENTOR
LOUIS L. PACKER

BY Finnegan & Henderson
ATTORNEYS

METHOD FOR MEASURING WALL THICKNESS OF ARTICLES USING GASEOUS RADIOACTIVE MATERIAL

This invention relates to a method of measuring the wall thickness of hollow articles. More particularly, it relates to a nondestructive method of measuring the wall thickness of hollow articles using a radioactive gas.

Much effort has been devoted in the past to the development of a nondestructive method for measuring the wall thickness of hollow articles. While such methods have been sought for use where wall thickness measurements are needed in all types of air cooled hardware, the problem has been particularly acute in the measurement of the hollow turbine blades and vanes that recently have been added as an improvement in the design of gas turbine engines for jet aircraft. If, in the production of these turbine blades and vanes, there is a misalignment in the forging or the cores shift during casting, the resulting thin wall section in a blade or vane may make it too weak to use. It is therefore desirable to have a nondestructive means for measuring the wall thickness of such blades and vanes before their use in an engine.

While a random sample type check can be made by destroying selected blades and vanes and measuring their wall thickness, this procedure is not satisfactory, since it is obviously limited in accuracy, is based on statistical rather than empirical principles, and does not allow measurement of the actual blades and vanes that are to be used in the engine.

One method that has been proposed in the past for measuring the wall thickness of such turbine blades and vanes embraces injecting a radioactive liquid, such as samarium 153 ($Sm^{153}$) or thulium 170 ($Tm^{170}$), into the cavity of the hollow blade or vane and then measuring the intensity of radiation that passes through the wall of the turbine blade or vane to determine the wall thickness. Such a liquid system, however, presents numerous problems and has many shortcomings that can be overcome when a radioactive gas system is used.

Radioactive liquids in general are hard to handle because they are subject to spillage and the like with resultant radioactive contamination of plant areas in which they are used. For these reasons, radioactive liquids present significant safety hazards. Further, surface tension effects make it difficult to fill small voids with radioactive liquids, although these problems can be overcome to some extent through the use of wetting agents.

Radioactive liquids are primarily useful for measuring wall thicknesses of single units. In prior art systems, the liquid is usually injected into the unit being measured with a large hypodermic type needle, hollow needle probe, or the like. While procedures could, of course, be devised for measuring many articles simultaneously with radioactive liquids, such procedures are complicated by difficulties encountered in effectively removing the liquid after the desired measurements have been made.

The radioactive liquids heretofore used in measuring hollow article wall thickness can cause severe radiation contamination problems in the articles being measured. Sm is a rare earth metal, and causes a relatively high degree of contamination in alloy turbine blades and vanes measured with it until it has decayed sufficiently to reduce the contamination effects. Since $Sm^{153}$ has been used in liquid form or with a liquid carrier, it is extremely difficult to remove it completely from blades or vanes after measuring, without leaving some radioactive $Sm^{153}$ residue in the workpiece. This residue produces high contamination levels in the workpiece, and causes safety hazards from residual radioactivity. Recovery and reuse of such radioactive liquids after completion of the wall thickness measurement is difficult.

In determining the wall thickness of hollow articles by measuring the intensity of the ionizing radiation passing through the wall, it is highly desirable to measure the intensity of the discrete X- and gamma-rays penetrating the wall. Thickness determinations made by measuring discrete X- and gamma-radiation are much more accurate than those obtained by measuring other types of ionizing radiation resulting from the decay of radioactive materials having high beta-energy emissions.

The radioactive liquids used in the prior art, such as Sm, are characterized by undesirably high levels of beta-energy, which produce high levels of background noise, making accurate reading of the discrete X- and gamma-radiation penetrating the wall more difficult. This high beta-energy causes bremsstrahlung formation which also creates undesirable levels of background noise. Of course, the bremsstrahlung can itself be measured, but this method does not give nearly as accurate an indication of wall thickness as direct measurements of discrete X-ray and gamma-ray radiation.

One additional disadvantage of the prior art radioactive liquid processes is the extremely high cost of such processes. As an example of this cost, one curie of Sm costs about 1200.

In view of the foregoing disadvantages of the prior art processes, it is a primary object of this invention to provide a new and improved method for measuring the wall thicknesses of hollow articles using principles of radioactivity.

Another object of this invention is to provide an improved process for measuring the wall thicknesses of hollow articles using a radioactive material which can be readily removed from the hollow configuration being measured, after the measurement is completed.

Still another object of this invention is to provide a method of measuring the wall thickness of hollow articles using a radioactive material that causes no contamination of the workpiece being measured, and creates no safety hazard in the vicinity where the measuring process is being carried out.

Yet another object of this invention is to provide a process for measuring the wall thicknesses of hollow articles by inserting a radioactive material inside the articles, which radioactive material is sensitive to any configuration of the interior of the hollow article, uniformly fills the article being measured, and can be compacted or pressurized to create very high specific activities of radiation if desired. "Specific activity" is herein defined as a measure of the radiation activity per given volume of a substance; it is usually measured in milicuries per $cm^3$.

A further object of this invention is to provide a process for measuring the wall thicknesses of hollow articles using a radioactive material that is low in cost (as low as about $20 per curie), that can be removed from hollow configurations upon completion of measurement (even when the articles being measured have only a single access hole), that can be reused to measure wall thicknesses of additional hollow articles, and that can be readily disposed of by controlled venting to the atmosphere.

A still further object of this invention is to provide a method for measuring the wall thickness of hollow articles using a radioactive material that transmits measurable quantities of discrete X-rays and gamma-rays and only low levels of background noise through the walls being measured.

Another object of this invention is to provide a method for measuring the wall thickness of hollow articles which lends itself well to automation and can be used to measure the wall thickness of a multiplicity of such articles simultaneously.

Still another object of this invention is to provide an improved method for measuring the wall thickness of hollow articles using a radioactive gas.

Yet another object of this invention is to provide a method for measuring the wall thicknesses of hollow articles using a radioactive gas, which method includes an improved procedure for transferring the radioactive gas into the hollow article being measured and subsequently removing it therefrom.

Other and further objects and advantages of this invention will be readily apparent to those skilled in the art upon a reading of this disclosure and the appended claims, or may be learned by the practice of the invention described herein, and illustrated by the accompanying drawings, in which:

It has been found that the foregoing objects can be achieved through the use of radioactive gas to measure the wall thickness of hollow articles. The method of this invention comprises transferring a radioactive gas into a hollow article, and measuring the intensity of the radiation transmitted through the walls of the article desired to be measured. The intensity of the transmitted radiation provides an accurately measurable indication of the thickness of the wall or walls. The preferred radioactive gas used in accordance with this invention is Xenon. The Xe isotope used can be either $Xe^{133}$ or $Xe^{131}$. Mixtures of these isotopes can also be used thereof. These Xe isotopes possess similar nuclear properties and can be freely substituted, in whole or in part, for each other in the usages of this invention. The nuclear characteristics of the radioactive isotopes of Xenon are given in table 1.

TABLE 1

| Xenon Isotope: | Half-life, days | Gamma-ray energy, kev. | X-ray energy, kev. | Ratio of X-ray to gamma-ray |
|---|---|---|---|---|
| 131 | 12 | 164 | 31 | 27 |
| 133 | 5.3 | 81 | 31 | 2 |

Figure 1:
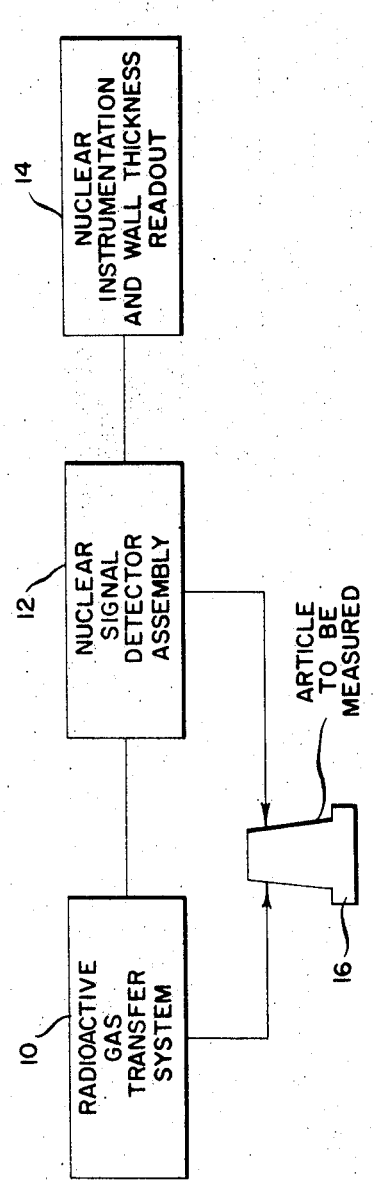
FIG. 1 is a block diagram showing schematically the general procedure used in the method of this invention.

The general method of this invention is illustrated in FIG. 1. In this block diagram, hollow article 16 to be measured is connected to radioactive gas transfer system 10 which transfers a radioactive gas into the hollow article. The intensity of the radiation passing through the wall of hollow article 16 is measured by nuclear signal detector assembly 12, and this measurement is transmitted to nuclear instrumentation and wall thickness readout assembly 14 which is calibrated to convert the intensity measured by detector assembly 12 into an indication of the wall thickness of article 16. In accordance with the invention a multiplicity of detectors can be used to make thickness measurements at various points on a single hollow article. Also, the present method can be used to measure many hollow articles, either in sequence or simultaneously.

In a preferred form of the invention radioactive $Xe^{131}$ or $Xe^{133}$ gas is introduced into the cavity of the hollow article to be inspected. The wall thickness sensing signal originates from both the discrete gamma-radiation emitted during the beta minus decay of the radioactive Xe gas, and the discrete X-rays emitted during the K-shell conversion. The intensity of the X-rays and gamma-radiation transmitted through the wall of the hollow article is measured by the detector assembly 12 and relates to the wall thickness at the point of inspection.

The intensity of the signal originating from the gamma-radiation and the X-rays transmitted through the wall of the hollow article varies in accordance with the radiation absorption law:

$$I = I_0 e^{-\mu x}$$

where I is the intensity of the radiation that is transmitted through the wall being measured; $I_0$ is the original radiation intensity of Xe or other radioactive gas introduced into the hollow article; $\mu$ is the attenuation coefficient of the wall material for the specific gamma- and X-ray energies of the radioactive gas used; and $x$ is the wall thickness of the wall being measured.

A collimated beam of radiation transmitted through a specific area of the wall being measured is viewed by a detector assembly scintillation crystal, which converts the radiation into light pulses. These light pulses are electronically amplified by a photomultiplier tube which is optically coupled to the scintillation crystal. The electrical pulse output from the photomultiplier tube is subsequently amplified and converted to a readout that is directly related to the intensity of the transmitted radiation beams. By comparing this readout to previously obtained wall thickness vs. readout calibration data, the thickness of the wall can be determined.

After the wall thickness determination has been completed, the radioactive gas is removed from the hollow article cavity for subsequent reuse.

Figure 2:
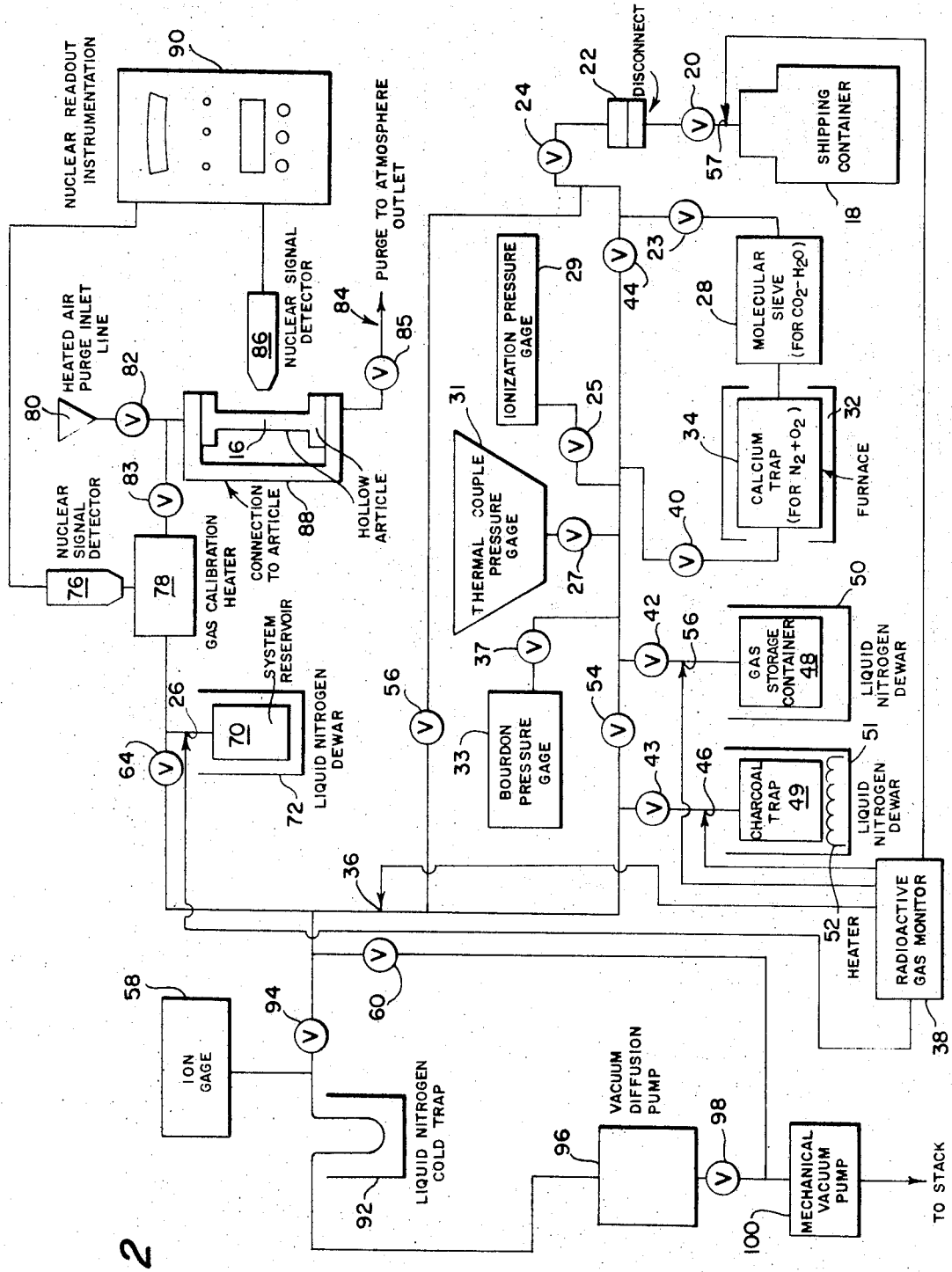
FIG. 2 is a block diagram that illustrates schematically and in detail the preferred method of this invention.

A system which can be used in accordance with a preferred embodiment of the method of this invention is schematically illustrated by the block diagram shown in FIG. 2. The radioactive gas to be used in measuring the wall thickness of hollow turbine blades or vanes or other hollow hardware, can be obtained from an appropriate source, such as Oak Ridge National Laboratories, in cylindrical shipping tanks, such as tank 18 shown in FIG. 2. The radioactive gas is transferred from tank 18 to gas storage container 48, for subsequent use in the measurement of the wall thickness of hollow article 16. This transfer is carried out by evacuating the entire system as shown in FIG. 2 to a pressure of about 1 micron with vacuum diffusion pump 96 and mechanical vacuum pump 100. Shipping tank 18 is then connected to the system at disconnect 22 and vacuum pumps 96 and 100 valved off from the remainder of the system with valves 56, 60 and 94. Liquid nitrogen is introduced into dewar 50, and valve 20 is opened allowing the radioactive gas to pass into the system. With valves 23, 24, 40 and 42 open and valves 43, 44 and 64 closed, the gas is condensed on the walls of the gas storage container 48.

The radioactive gas transfer system operates on a vacuum-freeze cycle, termed "cryopumping". By introducing liquid nitrogen into dewar 50 surrounding the gas storage container 48, the temperature of the radioactive Xe (or other) gas in the gas storage container can be reduced to about 77°K. at which temperature the Xe is solidified with a partial pressure of about $5 \times 10^{-3}$ mm. of Hg. The lowering of the Xe temperature in the reservoir effectively creates a pressure imbalance in the entire gas system, and the system in an attempt to balance the pressure by selectively concentrating the Xe (or other radioactive) gas at the point of lowest temperature, i.e., in gas storage container 48.

As the radioactive gas is cryopumped from shipping container 18 to storage container 48, it passes through a purification system which removes impurities resulting from manufacture and transport. This purification system comprises a zeolite molecular sieve 28 to remove carbon dioxide and water vapor, and a calcium trap 34 (hot calcium turnings) to remove oxygen and nitrogen.

Valve 42 is closed when the system reaches an equilibrium condition of about $5 \times 10^{-3}$ mm. of Hg. In order to further lower the gas concentration valves 43 and 54 are open and the gas is absorbed on the charcoal trap 49, which is surrounded by liquid nitrogen dewar 51. The use of charcoal absorption at 77°K. reduces the partial pressure of Xe to about $1 \times 10^{-4}$ mm. of Hg. THe use of charcoal trap 49, operating at 77°K, is of significant assistance in the gas transfer when gas impurities are present in the radioactive gas. The charcoal trap operation at 77°K is also of value when more rapid cryopumping of the radioactive gas is required. Thus the radioactive gas can be removed rapidly from charcoal trap 49 by heating the charcoal using heater 52.

The same purification system described above can be used for repurification of the radioactive gas immediately before measuring the wall thickness of the hollow hardware. Repurification is necessary because of impurities resulting from outgassing and air leakage that can occur while the radioactive gas is in use. Thus, by proper manipulation of the valves, cryopumping with liquid nitrogen, use of both gas storage container 48, charcoal trap 49, and heater 52, the gas is pumped in a complete cycle through the purification system and back to gas storage.

The location of the radioactive gas in the gas transfer system is determined by radioactive gas monitor 38, which is connected to detectors 26, 36, 46, 56 and 57 located in various parts of the gas transfer system. The detecting units of the radioactive gas monitor consists of nuclear detectors, such as Geiger-Mueller counters, positioned in various parts of the gas transfer system to determine the location and specific activity of the radioactive gas.

Pressure gauges 29, 31 and 33 are used to make gas inventories, i.e., to determine the amount of radioactive gas in the portion of the system to which they are operably connected. A variety of gauges are provided because of the widely varying pressures encountered in the system.

The next step in the method of this invention is transferring the radioactive gas from the storage container 48 into the hollow article 16. This step is carried out by evacuating the internal void of the hollow article or articles to a pressure of about 1 micron, valving off the vacuum pumps from the remainder of the system, removing the liquid nitrogen from dewar 50, and allowing the radioactive Xe (or other radioactive gas being used) to come to equilibrium within the entire gas system. The valves in the system are regulated to connect gas storage container 48 to the hollow article 16. The pressure between the hollow article and the gas reservoir is allowed to equilibrate, with equilibrium being determined by observation of the radioactive gas monitors and detectors 86 and 76. This fills the hollow article 16 with the radioactive gas.

The radioactive gas can be more highly concentrated within the hollow article by condensation with liquid nitrogen or other low-temperature apparatus and by isolating the region with valves. Thus, the radioactive gas can be transferred to the hollow configuration by reducing the temperature of the hollow article below that of the storage container and the remainder of the system. For example, liquid nitrogen can be placed around article holder 88, thereby concentrating the radioactive gas in the hollow article. Valve 83 is then closed and the gas allowed to come to equilibrium by removing the medium that produced the temperature differential (i.e., liquid nitrogen).

Concentration of the radioactive gas in the hollow article by the use of a temperature differential, such as by surrounding the article being measured with liquid nitrogen, is feasible when the thickness of only a single work piece, such as a single turbine blade, is being measured. When a mulitiplicity of blades, vanes or other articles being measured (which is the usual procedure in commercial measuring operations), it is not economically feasible to surround each article with liquid nitrogen or the like. In such cases it may be desirable to maintain one or more gas system reservoirs in close proximity to the work pieces, so that the establishment of an equilibrium condition between the reservoir or reservoirs and the work pieces will not require the use of undue amounts of radioactive gas.

Such a system is illustrated in FIG. 2 which shows a gas system reservoir 70 surrounded by liquid nitrogen dewar 72. When such a gas system reservoir is used in the system illustrated by FIG. 2, the radioactive gas is transferred from storage container 48 to reservoir 70 by properly aligning the valves, removing the liquid nitrogen from dewar 50 and allowing the radioactive gas to come to ambient temperature, and introducing liquid nitrogen into dewar 72 to concentrate the radioactive gas in system reservoir 70. Then by closing valve 64, removing the liquid nitrogen from dewar 72, and opening valve 83 equilibrium is established between gas reservoir 70 and hollow article 16, without requiring the use of large amounts of radioactive gas. Detector 76 and gas calibration header 78 are used to determine the specific activity of the radioactive gas transferred from storage container 48 or system reservoir 70 into hollow article 16.

While the radioactive gas is located in the void of hollow article 16, the intensity of the radiation transmitted through at least one wall of the hollow article is measured by nuclear signal detector 86. This measured intensity provides an indication of the thickness of the wall or walls being measured. Of course, the system can be connected to many hollow articles at the same time and the walls of these articles can be measured simultaneously by using a multiplicity of nuclear signal detectors.

After the measurement is completed, dewar 50 (or dewar 72 if gas reservoir 70 is being used) surrounding gas storage container 48 is filled with liquid nitrogen to transfer the radioactive gas from the hollow article 16 to the gas storage container (or system reservoir) by cryopumping. The gas transfer endpoint is determined by observing radioactive gas monitor 38.

If the specific activity of the gas used in the process of this invention becomes undesirably low, due to normal radioactive decay, the gas can be removed from the system, as by cryopumping into any suitable storage container (such as back into the shipping container) for completion of its decay. When the specific activity of the gas becomes reduced due to normal decay, additional radioactive gas can be charged to the system to compensate for this reduced activity. The system can be pressurized to increase the specific activity if desired.

Complete decontamination of the hollow article following its measurement is accomplished by applying heat to the article. The heat can be applied either by flowing heated air or another gas, such as heated nitrogen, through the internal passages of the article or articles which have been measured; or by heating the articles in an oven to drive off the radioactive gas. FIG. 2 shows the location of hot air purge inlet line 80, and hot air purge outlet line 84 which can be used for decontamination of hollow article 16 by flowing heated air through the internal passages of the article. Heated air is flowed through the hollow article by opening valves 82 and 85.

Figure 3:
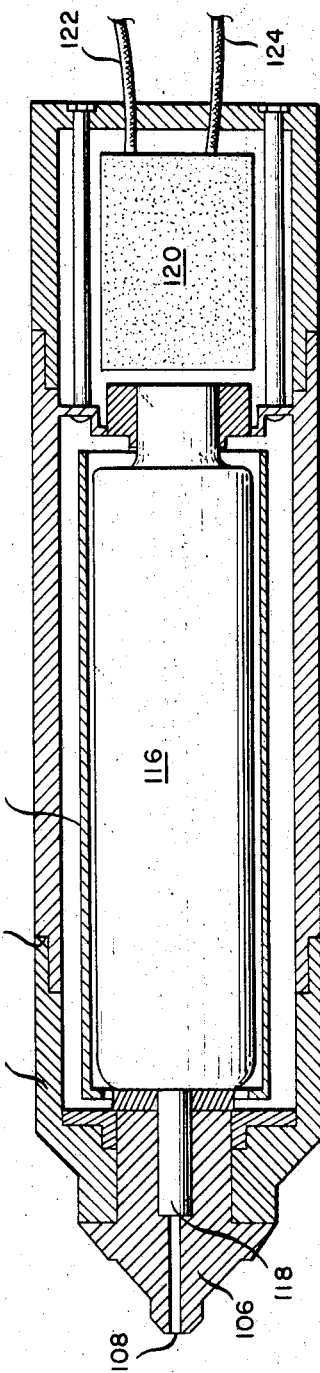
FIG. 3 is a sectional view of a suitable nuclear detector assembly for measuring radiation transmitted through the wall of a hollow article in accordance with the method of this invention.

The nuclear signal detector shown as 86 in FIG. 2 is more clearly illustrated in FIG. 3. In FIG. 3 nuclear detector assembly 86 consists of a collimator 106 containing collimator hole 108 through which the incident ionizing radiation transmitted through the wall of the hollow article impurges on the scintillator crystal 118 where it dissipates its energy in the ionization and excitation of the molecules. A fraction of this ionizing energy is converted into photons which fall on the photocathode of the photomultiplier tube 116 which is optically coupled to the scintillation crystal 118. The fall of photons on the photocathode causes emission of photoelectrons from the cathode. These photoelectrons are then multiplied by secondary electrons ejected from the dynode elements of the photomultiplier tube, producing an electron avalanche which in turn produces a voltage pulse signal in the output capacitor which is transmitted by signal line 124 to instrumentation and readout devices which relate the signal to the wall thickness of the wall which has been measured. High voltage line 122 transmits the high voltage needed by the photomultiplier tube into the detector assembly 86.

The entire nuclear detector assembly is surrounded by radiation shielding 110 and magnetic shielding 114, which minimize the background noise passing to the detector and interfering with the desired reading of the X-rays and gamma-radiation.

Radiation shielding 110 is preferably constructed using step joints or offsets such as those illustrated as 112, which prevent leakage of radiation into the scintillation counter from any source other than through the collimator hole.

The radiation shielding is preferably made from machinable tungsten alloys, such as, for example, a W-1Cu alloy.

As pointed out above, nuclear detector assembly 86 of FIG. 3 functions to define and detect a collimated beam of X-rays and gamma-radiation originating from the radioactive gas in the hollow article and transmitted through the wall being inspected. When $Xe^{133}$ is the radioactive gas, used, the thickness of the wall is determined by measuring the intensity of the 31 key X-ray radiation and the 81 key gamma-radiation transmitted through the wall of the hollow article.

While it is possible to measure bremsstrahlung radiation, such as that exhibited by the decay of high beta-energy radioactive materials, this procedure is not nearly as accurate as the measurement of the discrete gamma- and X-ray radiation emitted by radioactive Xe and other similar radioactive gases.

As shown in FIG. 3, the scintillation crystal and the photomultiplier tube are completely enclosed in the detector shielding 110 and 114 except for the collimator hole 108. Collimator hole 108 defines the detector source viewing geometry, while the exterior dimension of the detector shielding limits the inspection capabilities on curved article surfaces.

The detector viewing geometry of the location to be inspected should be restricted to as small an area as practical. Some of the hollow turbine blades which are measured in accordance with this invention have pedestals within the blades. It is therefore important that the detector be capable of "interrogating" at a point between these pedestals. Restricted viewing geometry is also required to minimize the effects of viewing a varying source volume at the at the specific wall inspection area on similar blades because of shifts in location of interior structure. The detected signal intensity is directly proportional to the radioactive source volume viewed the sodium iodide crystal, and a decrease or increase in signal intensity can result from changes of detector viewing geometry thereby limiting the accuracy of this method.

It is also important to bring the detector assembly as close to the wall being measured as possible. This minimizes the area of the wall that is viewed by the detector and reduces the possibility of inaccuracy resulting from averaging the radiation transmitted through the wall over a larger than necessary viewing area.

The use of a scintillation crystal type counter as the nuclear signal detector in accordance with the method of this invention is greatly preferred. Scintillation counters achieve greatly improved performance over Geiger-Mueller counters or like apparatus, because scintillation counters can discriminate between various types of energy, whereas a Geiger-Mueller counter merely counts radiation pulses. MOre accurate readings can therefore be achieved using a scintillation counter. The preferred scintillation crystal 118 of FIG. 3 is a radiation sensitive thallium (Tl) activated sodium iodide crystal [NaI(Tl)].

The use of nuclear signal detectors of the general type illustrated in FIG. 3 is conventional in the art. It is possible, however, by specific variation of parameters such as the size, shape, and length of the collimator hole, shield thickness and exterior dimension, signal-to-noise ratio, crystal dimension, and photomultiplier tube characteristics, to optimize the detector for use in measuring the wall thickness of any particular article under inspection. A nuclear detector such as that shown in FIG. 3 provides extremely high sensitivity to hollow article wall thickness variation.

As a practical matter, the minimum signal intensity which must be transmitted through the wall being measured can be reduced by increasing the length of sample collection time, and by improving the signal-to-noise ratio of the detector system.

Detector noise results from radiation incident on the detector crystal from paths other than through the collimator hole. Detector noise intensity is accordingly directly related to the thickness of the detector shield. As pointed out above, it is desirable that the detector assembly view as narrow an area of the wall being inspected as possible. In achieving this desired restricted viewing area, however, two factors arise which have an adverse effect on the signal-to-noise ratio. First, as the viewing geometry is reduced, the signal intensity decreases, and hence the ratio of signal-to-noise also decreases. Second, the thickness of the radiation shield on the nuclear detector must be consistent with the requirement that the detector assembly have outer dimensions that permit a close approach to the surface of the article being inspected. This may in certain instances prevent the use of a desired thickness of radiation shielding, thereby permitting increased levels of noise to pass through the shielding. An undesirable decrease in signal-to-noise ratio can be overcome to some extent, however, by using a radiation shielding having a high attenuation coefficient, such as the machinable tungsten alloys referred to above.

Photomultiplier tube 116 of FIG. 3 must be compatible with the crystal emission light spectrum of the particular scintillation crystal 118 used in the nuclear signal detector assembly. The photomultiplier tube should also exhibit longterm spectral stability, high signal gain, low dark currents, and a minimum exterior diameter.

A high detector signal-to-noise ratio is facilitated by the use of a photomultiplier tube having an electronic pulse amplitude gain of greater than $10^5$, associated with dark currents of less than one count per minute at energies greater than 15 Kev. A minimum exterior diameter photomultiplier is useful in the production of the small exterior dimension in the overall nuclear detector assembly which is necessary to achievement of the desired minimal area of inspection. It may be possible to eliminate the effect of photomultiplier diameter on the magnitude of the area of inspection by the use of a light pipe.

It is necessary to the proper use of the method of this invention that the intensity of radiation transmitted through the wall being measured provide an indication of the thickness of the wall. This radiation is, of course, measured by nuclear signal detector assembly 86, shown in FIG. 3. The relation between this measured intensity and the thickness of the wall is preferably provided by a nuclear instrumentation and wall thickness readout system of the type illustrated in FIG. 4.

Figure 4:
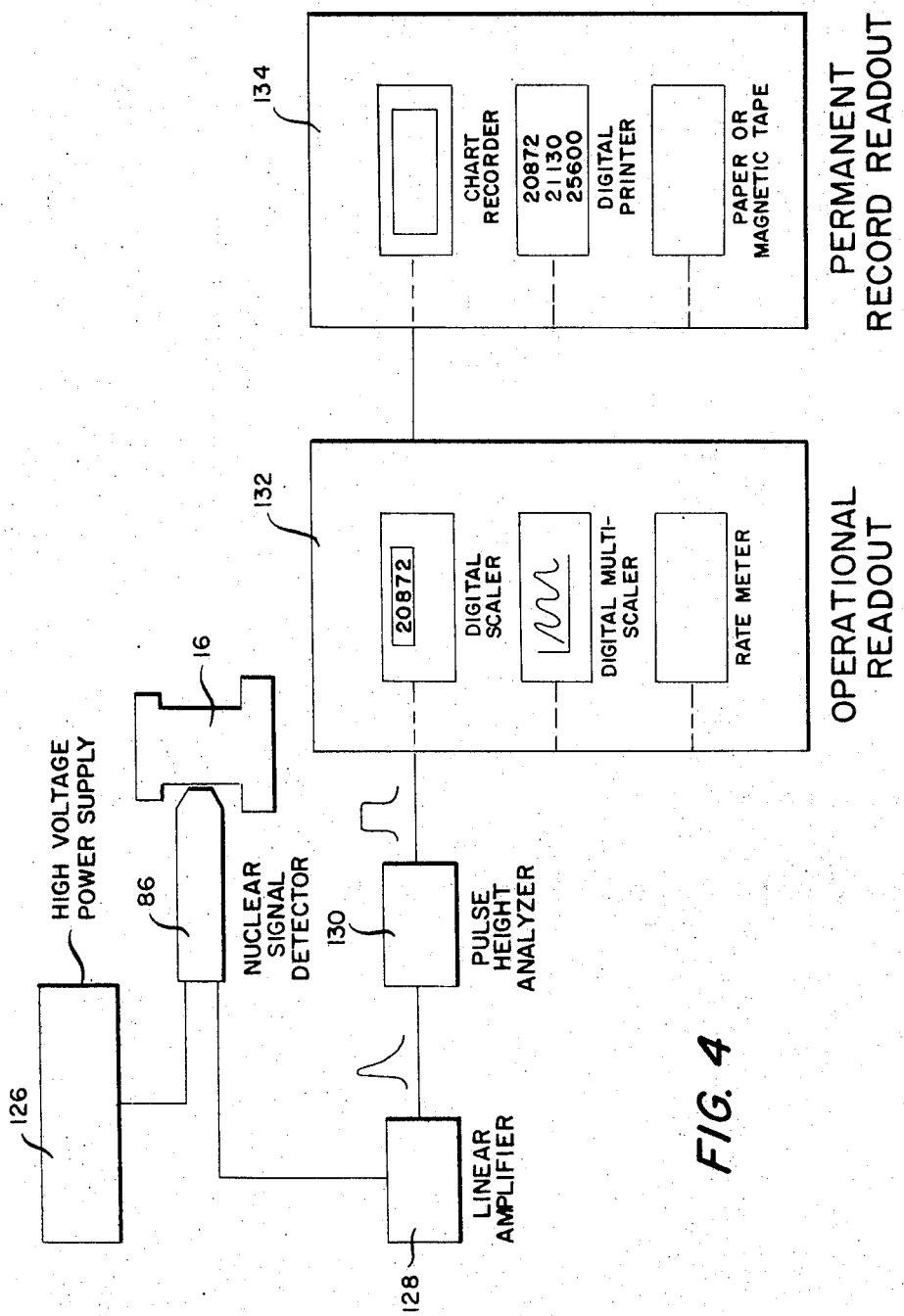
FIG. 4 is a schematic block diagram showing the instrumentation and wall thickness readout procedures used in accordance with the method of this invention.

FIG. 4 shows the nuclear instrumentation and its relationship to the detector assembly 86. The nuclear instrumentation consists of a high voltage power supply 126, a linear amplifier 128, a pulse height analyzer 130, an operational readout 132, and a permanent readout 134.

The high voltage power supply 126 provides the voltage required by the photomultiplier tube. This supply should be variable and capable of supplying from about 900 to 1,500 volts, and should be regulated to 0.005 percent.

Linear amplifier 128 increases the voltage magnitude of the signal from the photomultiplier to meet the input requirements of pulse height analyzer 130. The pulse height analyzer provides a constant voltage triggering output for each input pulse falling with the desired range of voltage magnitudes. This voltage range is called the "window," and is used to increase the signal-to-noise ratio by eliminating unwanted pulses. Such unwanted pulses may result from either radiation having a higher energy than the 81 Kev. gamma-radiation (if $Xe^{133}$ is the radioactive gas used) or from low energy noise pulses, such as those resulting from dark currents, bremsstrahlung and cosmic radiation. The "window" is thus an electronic sorting device which allows only pulses produced by energy of the desired levels to exit the pulse height analyzer.

The triggering output from the pulse height analyzer is suitable for digital handling techniques. It can be fed to any of several types of readouts to provide an operational visual display. Such readouts include a digital scaler, a digital multiscaler, or a rate meter. Any one or more of these readouts could be used by an operator for a qualitative estimation of wall thickness.

It is also desirable to provide a permanent readout, both for a permanent record and for more precise analysis of wall thickness data. Suitable types of permanent readouts include chart recorders, digital printers, and paper or magnetic tapes. Permanent readout 134 and operational readout 132 are shown in FIG. 4. it is highly desirable to use a digital readout system because it can be fed directly to a computer for more detained analysis.

The above description of this invention has been largely illustrated in a preferred embodiment is which Xe gas is used as the radioactive source. The gaseous radioisotopes $Xe^{131}$ and $Xe^{133}$ are, of course, the preferred gases of this invention, and are particularly preferred when the hollow article being measured is a turbine blade or turbine vane or a multiplicity of such blades and/or vanes. It is also possible, however, to use other radioactive gases in accordance with the process of this invention.

The instant method normally is use to measure very thin walls, such as those of turbine blades or vanes, and hence the difference between the thickness of a sound wall and one which has an undesirably great or narrow thickness can be very slight. It is, of course, necessary to the success of the method of this invention that the differences in radiation attenuation resulting from such slight variations in wall thickness produce a measurable energy differential. Thus, if the radioactive gas used has extremely high energy levels, the radiation passing through the wall may not be sufficiently affected by the variation in attenuation resulting from corresponding variations in the thickness of the wall to produce measurable energy differentials. On the other hand, if the radioactive gas used has an extremely low radiation energy, it may be completely attenuated in its passage through the walls, leaving no radiation to be measured for determining the wall thickness.

As a specific example of the above, radon-222 is not suitable for the measurement of turbine blade wall thickness because of its high energy of radiation. However, radon-222 is useful for making other types of wall thickness measurements, such as in measuring the wall thickness of hollow articles or larger size than turbine blades or vanes.

Other radioactive gases which are useful substitutes for $Xe^{131}$ and $Xe^{133}$ in the method of this invention are those which can be cryopumped and have both a desirable half-life and a desirable level of specific activity. In addition to radon-222, other suitable radioactive gases include krypton-85 and argon-37 or argon-39.

If Krypton-85 is radioactive gas used in accordance with the method of this invention, it may be desirable to substitute liquid neon for liquid nitrogen in the cryopumping system used in transferring the radioactive gas. It may be possible to cryopump krypton using liquid nitrogen if charcoal is used in the gas storage reservoirs in the gas transfer system. In addition to liquid neon, other materials which can be substituted for liquid nitrogen as a cryopumping medium in accordance with the method of this invention include liquid hydrogen and liquid helium.

For a clearer understanding of the invention, specific examples of the invention are given below. These examples are merely illustrative and are not to be understood as limiting the scope and underlying principles of the invention in any way.

EXAMPLES

The sensitivity and accuracy of he instant method of measuring the wall thickness of hollow articles was tested by measuring a nine hole TF-30 first stage turbine blade using radioactive $Xe^{133}$ gas in accordance with the method described above. After the desired number of measurement readings had been taken, the blade was destroyed and actual measurements made of its wall thickness at the various points where instrument readings previously had been taken.

Figure 5:
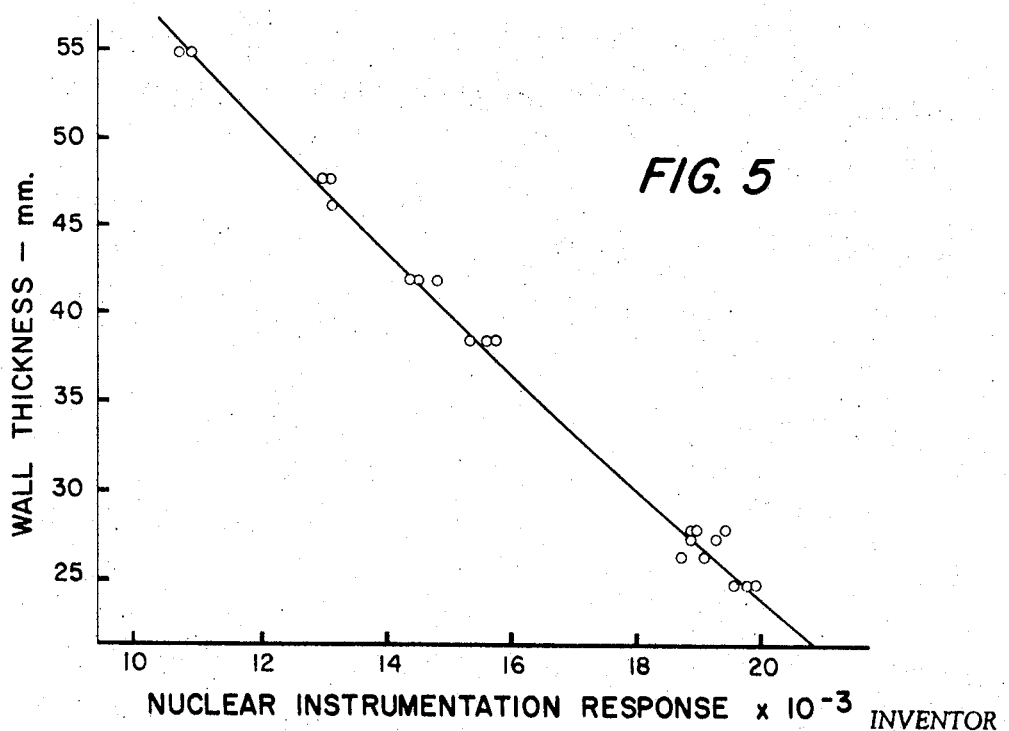

FIG. 5 is a graph plotting the wall thickness (in mils) versus the nuclear instrumentation response received at that wall thickness. The standard deviation of the experimentally determined points from the best fit curve to those points is 0.0010 inch (1 mil).

Figure 6:
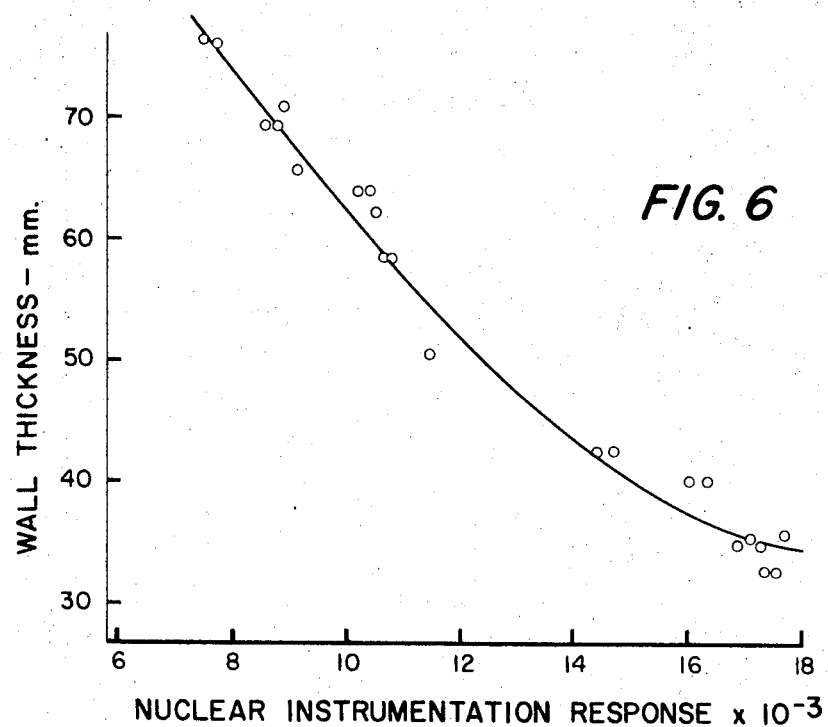
FIGS. 5 and 6 are graphs showing the results of an experimental demonstration of the method of this invention illustrating the accuracy of the method of this invention.

FIG. 6 is a similar curve to that of FIG. 5, in which the wall thickness of a pedestal cored TF-30 first stage turbine blade is plotted against the nuclear instrumentation response received at such wall thickness. The standard deviation of the experimentally determined points from the best fit curve for the data received in these tests is 0.0014 inch (1.4 mils). Xe-133 gas was also used in accordance with the method of this invention in making the instrument response readings shown in FIG. 6.

This invention in its broader aspects is not limited to the specific steps, methods and compositions described, but departures may be made therefrom within the scope of the accompanying claims without departing from the principles of the invention and without sacrificing its chief advantages.

I claim:

1. A method for determining the wall thickness of hollow turbine blades and turbine vanes which comprises: introducing a radioactive isotope of an inert, noble gas selected from the group consisting of argon, krypton and xenon into at least one hollow blade or vane to fill the interior cavity of said blade or vane with the radioactive gas, and measuring the intensity of the radiation transmitted through at least one wall of the hollow blade or vane, said intensity providing an indication of the thickness of the wall.

2. The method of claim 1 in which the radioactive gas is Xenon and the indication of the thickness of the wall is provided by measuring the intensity of the discrete X-ray radiation and gamma-radiation transmitted through the wall of the hollow blade or vane.

3. A method for measuring the wall thickness of hollow turbine blades and turbine vanes which comprise the steps of:
   a. passing a purified radioactive isotope of an inert, noble gas selected from the group consisting of argon, krypton and xenon into a gas storage reservoir;
   b. evacuating the internal void of a hollow blade or vane to be measured;
   c. transferring the radioactive gas into the internal void of the hollow blade or vane by connecting the interior cavity of the evacuated blade with the storage reservoir and allowing the pressure between the cavity and the reservoir to equilibrate;
   d. measuring the intensity of the radiation transmitted through at least one wall of the hollow blade or vane, said intensity providing an indication of the thickness of the wall; and
   e. removing the radioactive inert gas from the blade or vane and transferring the gas back to the reservoir by cooling the reservoir to establish a temperature differential between the hollow blade or vane and the reservoir.

4. The method of claim 3 in which the radioactive gas is xenon.

5. The method of claim 3 in which the radioactive gas is concentrated in the hollow blade or vane during step (c) by cooling the hollow blade or vane to establish a temperature differential between the hollow blade or vane and the reservoir.

6. The method of claim 3 in which evacuation of the radioactive gas from the hollow blade or vane in step (e) is assisted by external heating of the hollow blade or vane.